US006239052B1

(12) United States Patent
Fukushima

(10) Patent No.: US 6,239,052 B1
(45) Date of Patent: May 29, 2001

(54) SINTERED CERAMIC BODY FOR SPARK PLUG, PROCESS FOR PREPARING THE SAME AND SPARK PLUG

(75) Inventor: Osamu Fukushima, Nagoya (JP)

(73) Assignee: NGK Spark Plug Co., Aichi-Ken (JP)

( * ) Notice: Subject to any disclaimer, the term of this patent is extended or adjusted under 35 U.S.C. 154(b) by 0 days.

(21) Appl. No.: 09/358,850

(22) Filed: Jul. 22, 1999

(30) Foreign Application Priority Data

Jul. 24, 1998 (JP) ........................................ 10-208460

(51) Int. Cl.[7] ........................ C04B 35/111; H01T 13/00

(52) U.S. Cl. ........................ 501/127; 501/153; 501/128; 313/118

(58) Field of Search ........................ 501/127, 153, 501/128; 313/118

(56) References Cited

U.S. PATENT DOCUMENTS

| | | | |
|---|---|---|---|
| 1,965,977 | 7/1934 | Kohl et al. . | |
| 2,917,394 | 12/1959 | Schurecht . | |
| 2,944,910 | 7/1960 | Schurecht . | |
| 3,929,496 * | 12/1975 | Asano et al. ........................ | 501/127 |
| 4,866,016 * | 9/1989 | Ando et al. ........................ | 501/127 |

* cited by examiner

*Primary Examiner*—Karl Group
(74) *Attorney, Agent, or Firm*—Browdy & Neimark

(57) ABSTRACT

The sintered ceramic body of this invention is a cylindrical insulator having a through hole used for spark plugs, which is characterized by comprising alumina as a main component and Sn component in an amount of 0.05–2 wt % as SnO and can be manufactured by a step of preparing a slurry by mixing a raw material powder comprising alumina as maakessmain component and Sn component in an amount of 0.05–2 wt % as SnO, water and a binder; a step of preparing a granulated powder from the slurry, a step of packing the granulated powder in a prescribed mold and pressing it to form a compact having the same shape as sintered ceramic body to be prepared and a step of sintering the compact. The spark plug of this invention is characterized by being provided with said sintered ceramic body having a through hole; a center electrode inserted in one end of said through hole; a main metal shell mounted on the outside of said one end of the sintered ceramic body, to which the center electrode is inserted; a ground electrode, which is attached to the main metal shell and has a tip closely confronting the center electrode; and a terminal which is mounted in the ther end of the through hole.

9 Claims, 11 Drawing Sheets

SINTERED CERAMIC BODY FOR SPARK PLUG, PROCESS FOR PREPARING THE SAME AND SPARK PLUG

FIELD OF THE INVENTION

This invention relates to a sintered ceramic body, a process for preparing the same and a spark plug. More particularly, this invention relates to a sintered ceramic body for spark plugs having excellent voltage withstanding ability, mechanical strengths and insulation property at high temperatures, a low cost process for preparing the same and a spark plug which comprises said sintered ceramic body as an insulator member and is suitable for internal combustion engines for vehicles.

BACKGROUND OF THE INVENTION

Conventionally, a spark plug for internal combustion engines for automobiles, etc. contains a sintered ceramic body called "insulator" as a member thereof. The sintered ceramic body is prepared using ceramic powder of alumina or the like, a sintering promoter of silicon oxide ($SiO_2$), calcium oxide (CaO) or magnesium oxide (MgO), or the like, and an organic binder such as polyvinyl alcohol (PVA). The thus prepared sintered ceramic body is required to have excellent voltage withstanding ability, insulation property and mechanical strength when it is used for spark plugs.

However, often sintered ceramic bodies, which do not satisfy the above-described requirements, have been manufactured.

A factor impairing the above-described required properties is presence of closed pores. Closed pores are closed spaces having major diameter of 0.5–2 mm in sintered ceramic bodies formed when they are prepared under some conditions.

The mechanism by which closed pores are produced in sintered ceramic bodies is considered to be as follows. During the manufacture of such sintered ceramic bodies, small particles of the organic binder are entrapped among the inorganic particles. This occurs because the ceramic slurry is prepared by dispersing the ceramic powder, a sintering promoter and the organic binder in water, and the organic binder remains during all the steps so that small organic particles remain in the formed compact. When the compact containing organic binder particles is sintered, the included binder combines with oxygen to form carbon dioxide gas. When heating of the compacts is started, sintering of the compact begins at a specific temperature and proceeds at a specific rate. If the sintering rate is greater than the rate of the reaction of the organic binder and oxygen, the sintering finishes before the formed carbon dioxide escapes out of the sintering compact and, as a result, closed pores are formed in the sintered ceramic body.

In order to expel the carbon dioxide out of the sintering compact before the sintering finishes by increasing rate of the carbon dioxide gas formation, the compact must be sintered at higher temperatures. This means that a more expensive apparatus, which withstands higher temperatures, must be used. Such is impracticable in view of the intention to manufacture spark plugs at lower cost.

Another cause of impairment of voltage withstanding ability, insulation property and mechanical strengths of the sintered ceramic body is presence of unavoidable impurities included in the raw materials. The sintering promoter is prepared by purifying clay. But it is impossible to completely remove impurities such as minute organic substance particles, fibers, etc. When a compact containing even a slight amount of unavoidable impurities is heated, they burn by the heat of sintering to generate a slight amount of carbon dioxide gas and minute voids are formed in the sintered ceramic body. It is considered that these minute voids also impair voltage withstanding ability, insulation property and mechanical strengths of the sintered ceramic body.

Sintered ceramic bodies to be incorporated in spark plugs are required to be manufactured at low cost in addition to having the above-described properties.

However, the alumina materials, which are conventionally used in manufacturing sintered ceramic bodies, contain a Na component, which exhibits high ionic conductivity, and therefore it is a matter of common sense among those skilled in the art to reduce the Na component content of alumina to not more than 0.05 wt % to satisfy the requirements for withstanding high voltage, good insulation property and high mechanical strengths of the resulting sintered ceramic bodies. As alumina raw material for the sintered ceramic body, low-soda alumina, which contains a Na content in an amount less than 0.1 wt %, is used by suitably purifying. This low-soda alumina is far more expensive than the medium-soda alumina, which is the Bayer Process alumina or the like and contains 0.1– 0.2 wt % of Na component as $Na_2O$, and ordinary soda alumina, which contains not less than 0.2 wt % of Na component. As the alumina normally used to make spark plugs is obtained by further purifying low-soda alumina, which is already expensive, in order to reduce the Na content to a level of no more than 0.05 wt % as $Na_2O$, such conventionally used alumina for spark plug is highly expensive.

The use of the aforementioned medium-soda alumina in order to reduce the manufacturing cost of sintered ceramic bodies has received little attention in the art, because it is well known and obvious to those skilled in the art that the properties of the resultant sintered ceramic spark plug bodies, especially the properties of withstanding high voltage, mechanical strength and insulation property, are unsatisfactory.

The objects of this invention are to provide (1) inexpensive sintered ceramic bodies, which contain closed pores and minute voids far fewer than conventional sintered ceramic bodies and which have good voltage withstanding abilities, insulation properties and mechanical strength better than or of the same level as the conventional products, (2) a low-cost process for preparing such excellent sintered ceramic bodies, and (3) an inexpensive spark plug incorporating the sintered ceramic body having the above-described excellent properties.

SUMMARY OF THE INVENTION

Sintered Ceramic Material

The sintered ceramic body of this invention is characterized by comprising alumina as the main component and a Sn component in an amount of 0.05–2 wt % as SnO.

The process of the sintered ceramic body of this invention is characterized by comprising:

- a step in which a slurry containing alumina, Sn inorganic powder in an amount of 0.05–2 wt % as SnO , water and a binder is prepared,
- a step in which granulated powder is prepared from the above-prepared slurry,
- a step in which the obtained granulated powder is shaped into a compact by packing it in a prescribed mold and applying pressure, and a step of sintering the compact.

The spark plug of this invention is characterized by comprising:

a cylindrical sintered ceramic body having a through hole, said sintered ceramic body containing alumina and Sn component in an amount of 0.05–2 wt % as SnO;

a center electrode inserted into one end of said through hole;

a main metal shell attached to the outside of said one end of the sintered ceramic body; a ground electrode attached to said main shell and having an end tip closely confronting said center electrode; and a terminal attached to the other end of the through hole of said sintered ceramic body.

BRIEF DESCRIPTION OF THE ATTACHED DRAWINGS

DETAILED DESCRIPTION OF THE SPECIFIC EMBODIMENTS

Sintered Ceramic Body

Figure 1:
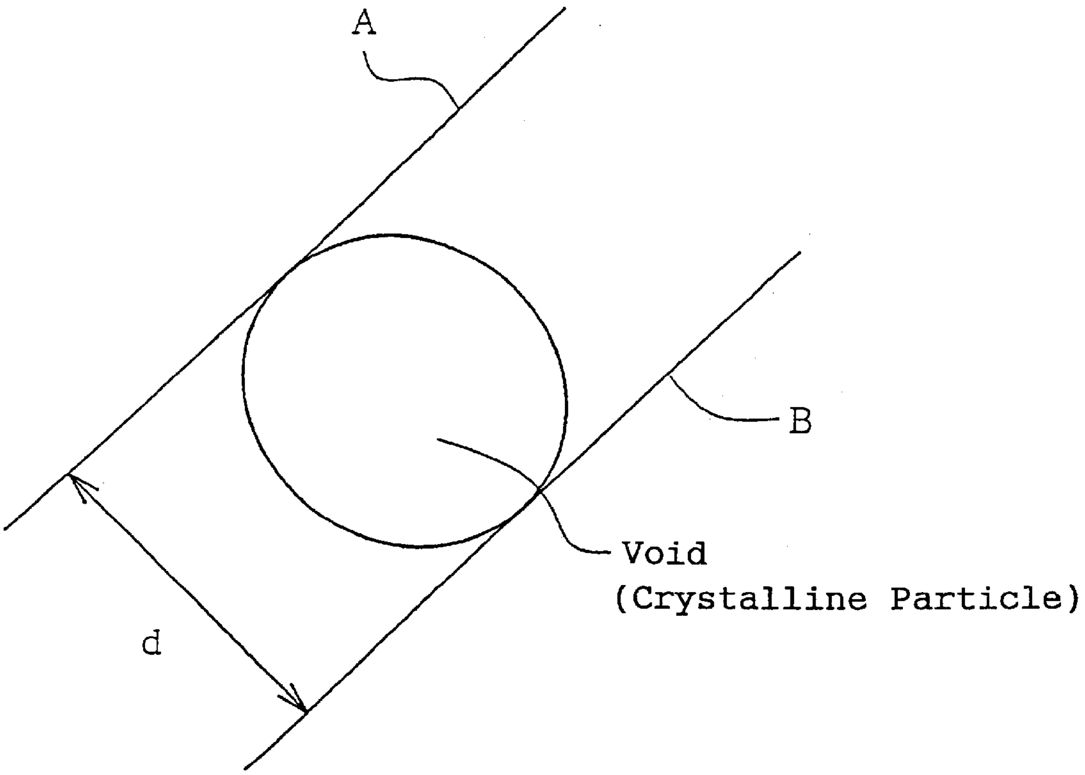
FIG. 1 is a schematic presentation explaining the definition of the size of minute voids and crystalline particles existing in the sintered ceramic body.

The sintered ceramic body of this invention has a through hole, in one end of which a center electrode is mounted, and in the other end thereof a terminal is mounted in a conventional manner. The sintered ceramic body is characterized in that alumina as a main component contains Sn in an amount of 0.05–2 wt %, preferably 0.05–0.5 wt % as SnO.

The Al component content as $Al_2O_3$ of this sintered ceramic body (designated as WAl) is preferably present in an amount of 85–98 wt %, preferably 90–98 wt % based on the total components of the sintered ceramic body. The sintered ceramic body, WAl of which is in said range, contains few closed pores and minute voids and, therefore, is dense. The sintered ceramic body, WAl of which is less than 85 wt % of alumina, is not always of satisfactory mechanical strength and the ability to withstand high voltage when used for spark plugs. The sintered ceramic body, WAl of which is in excess of 98 wt % is alumina is not always sufficiently dense and thus may be inferior in mechanical strength, because of a paucity of glass phase.

In this invention it is permissible that the sintered ceramic body contains Na in an amount of 0.07–0.5 wt %, but preferably only 0.07–0.25 wt %, as $Na_2O$. In this invention, it is against the conventional common knowledge and incredible that the voltage withstanding ability and mechanical strength are enhanced, and that the insulation property is not deteriorated, especially insulation resistance is scarcely reduced at high temperatures in excess of 500° C. even though the Na component content is in the above-described high range. This is a surprising fact, which defies the conventional knowledge.

The sintered ceramic body, the Sn content of which is in the above-described range, contains few closed pores and minute voids and thus is dense. The sintered ceramic body, which contains few closed pores and minute voids, has excellent voltage withstanding ability, an unimpaired insulation property and enhanced mechanical strength. Meanwhile, a sintered ceramic body, the Sn content of which is less than 0.05 wt % as SnO, is inferior in voltage withstanding ability and mechanical strength and not suitable for spark plugs. A sintered ceramic body, which contains in excess of 2 wt % of Sn component, is inferior in insulation property and voltage withstanding ability since the Sn component is inherently electrically conductive and therefore such sintered ceramic body is not suitable for a spark plug.

The sintered ceramic body of this invention may contain one or more component selected from the group of Si component, Ca component, Mg component, Ba component, Zn component and B component in addition to the Sn component.

Especially, the sintered ceramic body of this invention preferably contains one or more component selected from the group of Si component, Ca component, Mg component, Ba component, Zn component and B component in an amount of 0.1–15 wt %, preferably 3–10 wt % respectively as $SiO_2$, CaO, MgO, BaO, ZnO and $B_2O_3$ in total. The sintered ceramic body, which contains the above element components in the above-described amount, is dense and has high mechanical strength. The sintered ceramic body, which contains less than 0.1 wt % of the above additional element components, may be inferior in mechanical strength at high temperatures and voltage withstanding ability at high temperatures in comparison with a sintered ceramic body which contains said element component in said amount.

Of these element components, Ba component, B component and Zn component further improve high temperature strength of the sintered ceramic body conjointly with the other element components. The amount of the contained Ba component as BaO (designated WBaO) should be 0.02–1 wt %, preferably 0.15–0.7 wt %. When WBaO is less than 0.02 wt %, the effect of BaO to improve high temperature strength is no longer remarkable. When WBaO is present in excess of 1 wt %, the high temperature strength of the sintered ceramic body may be impaired. Meanwhile, the B component should be contained in an amount as $B_2O_3$ (designated W $B_2O_3$) of 0.01–0.75 wt %, preferably 0.15–0.5 wt % in the sintered ceramic body. When the W $B_2O_3$ content is less than 0.01 wt %, the effect of $B_2O_3$ to improve high temperature strength is no longer remarkable. When the W $B_2O_3$ content is in excess of 0.75 wt %, the high temperature strength of the sintered ceramic body may be impaired. The Zn component should be in an amount (designated WZnO) of 0.04 wt %–2 wt %, preferably 0.3 wt %–1.4 wt % in the sintered ceramic body. A sintered ceramic body, the WZnO content of which is less than 0.04 wt %, is inferior in comparison with a sintered ceramic body containing the above-described amount of $B_2O_3$ because the effect of a little ZnO in improving high temperature strength may be no longer remarkable. On the other hand, when the WZnO content is in excess of 2 wt %, the high temperature strength may be impaired.

The Si component should be present in an amount of 1.5–5 wt %, preferably 2 wt %–4 wt % as $SiO_2$. The Ca component should be present in an amount of 1.2 wt %–4 wt %, preferably 1.5 wt %–3 wt % as CaO. The Mg component should be present in an amount of 0.05 wt %–0.17 wt %, preferably 0.1 wt %–0.15 wt % as MgO.

Further, the sintered ceramic body of this invention may preferably contain at least one of Li and K in an amount of 0.05–0.3 wt %, especially 0.1 wt %–0.2 wt % respectively as $Li_2O$ and $K_2O$.

When the sintered ceramic body of this invention contains at least one of Li and K in the above-described amount, a glass phase is formed with the main component alumina, which, it is thought, prevents deterioration of insulation resistance as well as mechanical strength of the sintered ceramic body.

Although the sintered ceramic body of this invention contains the above described components mainly in the form of oxides, their presence as oxides is not observed in some cases, e.g. because of formation of an amorphous glass phase. Even in such a case, the sintered ceramic body, in which the total content of the above element components is in the above-described range, belongs to the scope of this invention. It can be confirmed by any single or any combination of the following methods ①–③ whether the Al component and the other element components are contained in the form of oxides or not.

① A method which confirms by X-ray diffraction whether an X-ray diffraction pattern reflecting the crystalline structure of the particular oxide appears or not.

② A method which confirms whether the Al component or the other element components and an oxygen component are simultaneously detected or not in a cross-sectional area which is presumed to be the same phase when the component analysis by a known method of microanalysis such as EPMA (electron prove microanalysis), EDS (energy dispersion X-ray spectrometry), WDS (wave length dispersion X-ray spectrometry) ,etc. is carried out. If the two are detected simultaneously, it is considered that Al and the other components are present as oxides. ③ A method which determines the valence of the atom or ion of Al and the other element components by a known method such as X-ray photoelectron spectrometry (XDS), Auger electron spectrometry, etc. When these elements exist in the form of oxide, the valence of the components are measured as plus values.

The sintered ceramic body of this invention comprises an alumina matrix phase particles containing not less than 99 wt % alumina and a glass phase which is formed at interparticle boundaries of the alumina matrix phase particles.

The Na content as $Na_2O$ in the glass phase (designated WGNa) contained in the sintered ceramic body of this invention should preferably be 0.4–2 wt %. When WGNa is in excess of 2 wt %, insulation resistance and voltage withstanding ability of the sintered ceramic body may be insufficient. The sintered ceramic body, the WGNa of which is less than 0.4 wt %, must be prepared from a low-soda alumina, the Na content of which is very low and, therefore, such sintered ceramic bodies cannot retain the low-cost superiority to the conventional product.

In this specification, as WGNa, values calculated approximately by the following method are employed. The surface of a sintered ceramic body is polished and the polished surface is observed by a scanning electron microscope and the structure image is analyzed to measure of the alumina matrix phase. The obtained value is designated γA. Then the average Na component weight content of the glass phase is measured by known microanalysis method (EPMA, EDS, WDS, etc.), and the Na content of the glass phase as $Na_2O$ (NGNa) is obtained. If it is presumed that a sintered ceramic body consists of alumina matrix phase and glass phase only and the sintered ceramic body is almost completely densified by sintering, the weight content of glass phase existing in the unit volume (MG) is given by the following formula: (1) when the apparent density measured by the Archimedes method, etc. is designated ρ0 (unit: $g/cm^3$) and the density of the alumina crystalline partcle is designated ρ1.

$$MG=\rho0-\rho1\cdot\gamma A \quad (1)$$

and

WGNa is given by $$WGNa=MG\cdot NGNa\times100=(\rho0-\rho1\cdot\gamma A)\cdot NGNa\times100(\text{wt }\%) \quad (2)$$

The preferred average particle diameter of crystalline particles in the alumina matrix phase is 2–20 μm, more preferably 5–10 μm. The particle diameter referred to here can be measured in the same manner as the measurement of the minute voids size described hereinafter. The "average particle diameter" means an average of particle diameters of a plurality of crystalline particles.

The suitable sintered ceramic body of this invention contains not more than 100 in average of minute voids having a size of not less than 10 μm in a 1 $mm^2$ area as observed in the cross section. When the average number of the minute voids is in this range, the sintered ceramic body exhibits a good voltage withstanding ability at high temperatures.

The "size of minute void" is defined as the maximum value "d" of the distance between the parallel line A and B when a plurality of sets of two parallel lines A and B are drawn so that they contact the outline of minute voids but do not cross the minute voids in the cross-sectional plane of a sintered ceramic body as shown in FIG. 1.

The number of the closed pores contained in the sintered ceramic body of this invention is fewer in comparison with that of the conventional sintered ceramic bodies. The number of the closed pores can be determined by measuring the number of the closed pores having a diameter of 0.5–2 mm found within an area of 1 $cm^2$ by image analysis in the polished surface when the surface is scanned by a scanning electron microscope (×150).

The preferred sintered ceramic body of this invention has an insulation withstanding voltage of not lower than 35 KV/mm at 20° C. The sintered ceramic body having such an insulation withstanding voltage has high durability, especially enhanced durability against penetration destruction. The insulation withstanding voltage of the sintered ceramic body can be measured as follows.

Figure 2A:
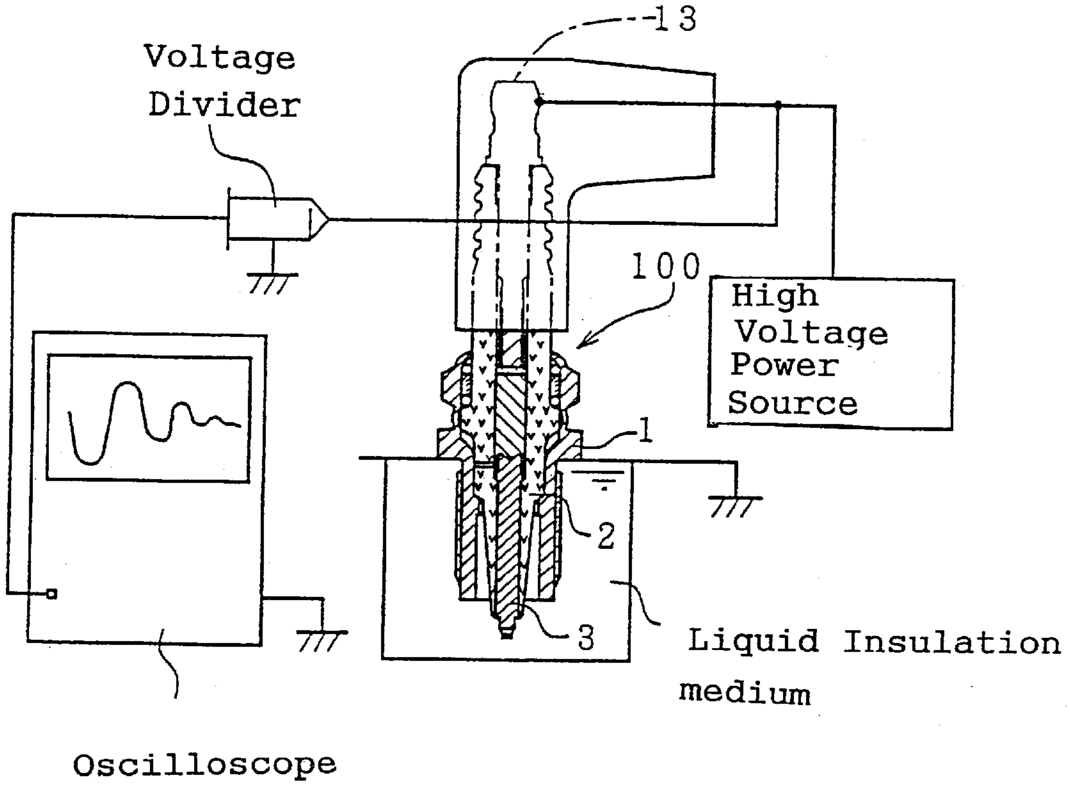
FIGS. 2A , 2B and FIG 2C are schematic presentations explaining the method for measuring insulation withstanding voltage.

That is, as shown in FIG. 2A, the opening part of a spark plug 100, from which the ground electrode is removed, is immersed in a liquid insulating medium such as silicone oil so that the outside of the sintered ceramic body incorporated in the spark plug and the inside of the main metal shell are insulated. Then an AC voltage or pulse voltage is applied across the main metal part 1 and the center electrode 3 from a high voltage power source. The voltage wave form (dropped by a potential divider at a suitable rate) is recorded by an oscilloscope, etc.

Figure 2B:
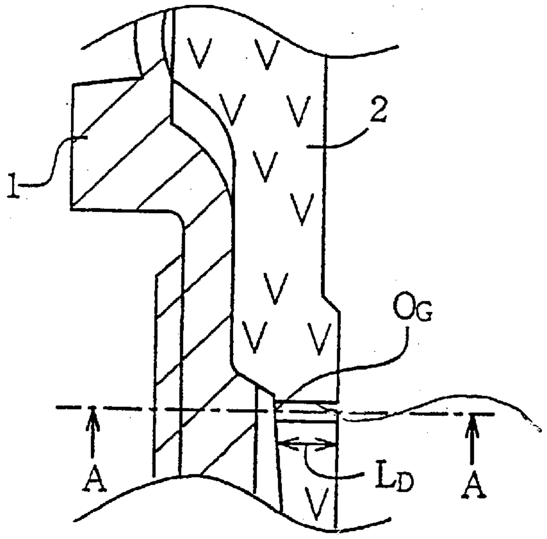
Figure 2C:
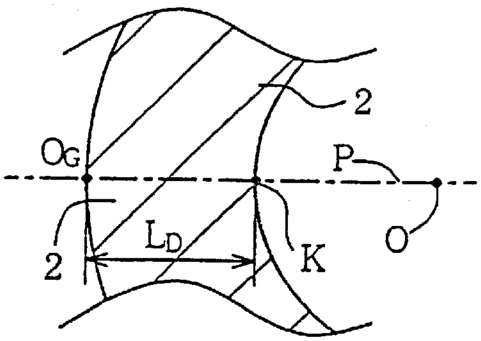

As shown in FIG. 2B the penetration destruction voltage VD, when a through hole is formed by the penetration destruction of the sintered ceramic body 2, is read from the wave form. The VD is divided by the thickness LD of the sintered ceramic body 2 at the position where the penetration destruction occurred. Then the insulation withstanding voltage is given as VD/LD. The position of the through hole is defined as the center of the opening formed on the surface of the sintered ceramic body 2. The thickness of the sintered ceramic body LD at the position of the through hole is defined, as shown in FIG. 2C, as the length of the line segment K-OG when a cross sectional plane which intersects the central axis line O of the sintered ceramic body 2 at a right angle is taken, and a straight line P passing the center of the opening OG and the center axis line O is drawn thereon.

Further, the preferred sintered ceramic body of this invention has a bending strength of not less than 300 MPa, preferably 350 MPa at room temperature. A sintered ceramic body, of which the bending strength is less than 300 MPa, is likely to suffer destruction because of insufficient strength when a spark plug, in which said sintered ceramic body is used, is attached to the attachment position of a cylinder head, etc.

In this invention, the "bending strength" is a three point bending strength (span length: 20 mm), which is measured in accordance with the method stipulated in JIS SR 1601 (1981) with necessary modification at room temperature.

Process for Preparing the Sintered Ceramic Body

In preparing the sintered ceramic body of this invention, a water and binder slurry containing a raw material comprising alumina, a specified amount of inorganic Sn component, and at least one of element component selected from Si, Ca, Mg, Ba, Zn and B components is admixed as desired.

The alumina content of the raw material powder is 85–98 wt %, preferably 90–98 wt % as $Al_2O_3$. The alumina may contain Na component in an amount of 0.07–0.5 wt %, especially 0.07–0.25,wt % as $Na_2O$. In this invention, alumina containing a higher amount of Na component can be used. Therefore, sintered ceramic bodies and spark plugs can be manufactured at lower cost.

According to our study, it is desirable to use alumina powder whose surface layer of the particles contains Na component in an amount of 0.01–0.2 wt %, especially 0.01–0.1 wt % as $Na_2O$. When alumina, of which the Na component content of the surface layer of the particles is in the above-described content range, is used, the raw material cost is reduced because (1) it is not needed to use a low Na component content alumina such as high cost low-soda alumina, and (2) the scrubbing of the alumina powder to remove the Na component on the surface layer of the particle required when high Na component content is used is no longer necessary. When alumina, which contains more than 0.2 wt % of Na component in the surface layer, is used, the resulting sintered ceramic body may be insufficient in insulation resistance and its ability to withstand high voltage.

The term "Na component content of the surface layer of the particles" means the value which is measured as follows. First, the total content (wt %) of Na component in the alumina in question is measured by ICP analysis, chemical analysis, etc., which is designated (WNa1). Then 100 g of the alumina is soaked in 100 ml of water at 90° C. for 1 hour without stirring. Thereafter the alumina powder is recovered and Na component content (wt %) is measured as $Na_2O$ again and is designated WNa2. The value of the previously measured WNa1 from which WNa2 is subtracted, i.e., WNa1−WNa2 (wt %), is the Na component content of the surface layer.

The average particle diameter of the alumina powder is preferably 1–5 μm, more preferably 1–3 μm. When it is in excess of 5 μm, a considerably high sintering rate must be employed to satisfactorily density the sintered ceramic body, densification may not proceed sufficiently and the high temperature strength and the ability to withstand high voltage of the sintered ceramic body are insufficient even if a considerably high temperature is employed.

The Sn inorganic powder is not specifically restricted in so far as it can be converted to tin oxide by sintering, and an oxide, composite oxides, hydroxide, carbonate, sulfate, nitrate, phosphate, etc. of Sn can be referred to as suitable examples thereof.

The preferred average particle diameter of the Sn inorganic powder is 1–5 μm, more preferably 1–3 μm . When the average particle diameter is in the above range, it is advantageous in that the Sn inorganic particles can be easily uniformly mixed with the alumina powder and the reaction smoothly proceeds during the sintering.

The Sn inorganic powder content in the raw material is adjusted so that the Sn component content of the resulting sintered ceramic body will be within the Sn content range in the sintered ceramic body of this invention as noted above. To our surprise, when an alumina raw material containing Sn inorganic powder is used, the sintered ceramic body is well densified containing fewer closed pores, and good insulation resistance and an ability to withstand high voltage are achieved even if the Na component content of the alumina is high.

At least one of the element component powders selected from Si, Ca, Mg, Ba, Zn and B can be used in the form of oxide, composite oxide, hydroxide, carbonate, nitrate, phosphate, etc. thereof. The average particle diameter of these inorganic powders is 1–5 μm, preferably 1–3 μm. When the average particle diameter in this range, it is advantageous in that the powder is uniformly mixed with the alumina powder because the particle size of the former is equal to that of the latter.

When the sintered ceramic body of this invention contains at least one element selected from Si, Ca, Mg, Ba, Zn and B, the inorganic powder content of these optional components is adjusted so that the sintered ceramic body contains the above-described amount of these elements.

The above-described raw material powder may contain at least one of a Li inorganic powder and a K inorganic powder. If Li inorganic powder and/or K inorganic powder is admixed, sintered ceramic bodies having insulation properties and mechanical strength which do not deteriorate at high temperatures, can be manufactured at low cost.

The water used for preparing said slurry is not specifically restricted. Ordinary water conventionally used for preparation of sintered ceramic bodies can be used.

As the above-mentioned binder, a wide variety of hydrophilic organic compounds such as polyvinyl alcohol, water-soluble acryl resins, gum arabic, dextrin, etc. can be referred to. Polyvinyl alcohol is most preferred.

The mixing ratio of water and the binder is 40–120 parts by weight, especially 50–100 parts by weight of water to 0.1–5 parts by weight, especially 0.5–3 parts by weight of the binder per 100 parts by weight of said raw material powder.

The method of preparing said slurry is not specifically restricted. Any procedure can be employed in so far as said raw material powder, said water and said binder can be mixed to form a slurry.

In this invention, a granulated powder is prepared from the thus prepared slurry. For preparation of the granulated powder, a spray dryer which spray-dries the slurry can be used. The preferred average particle diameter of the granulated powder is 30–200 μm, especially 50–150 μm.

In the process of this invention, the thus obtained granulated powder is packed into a prescribed mold and pressed to form a compact, which has the shape of the sintered ceramic body to be prepared. An example of press molding is rubber press molding.

Figure 3:
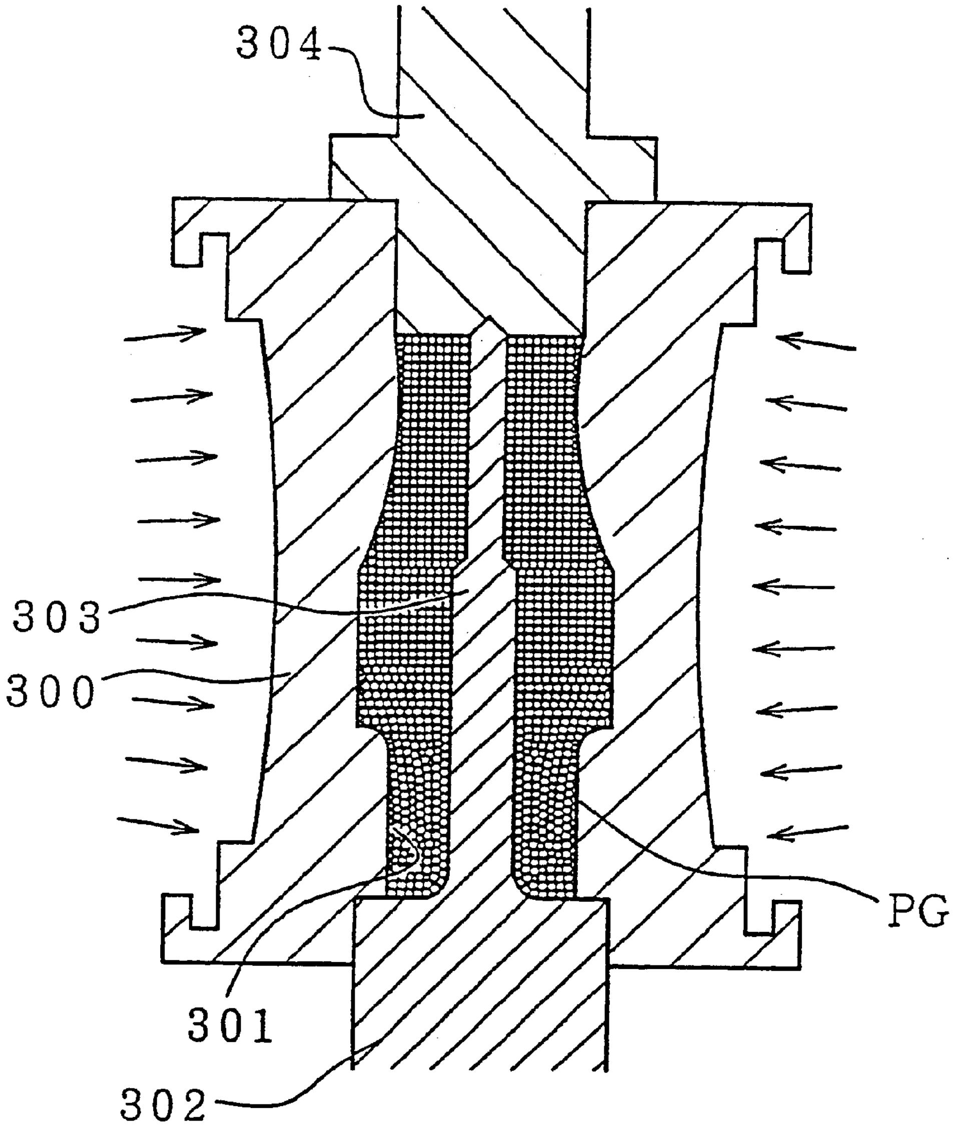
FIG. 3 is a schematic presentation explaining the rubber press method.

In an example of rubber press molding as shown in FIG. 3, a rubber mold 300 having an axially penetrating cavity 301 is used. A bottom punch 302 having a press pin 303, which is integrally formed and axially extends from the surface of the bottom punch 302, is inserted into the mold and defines the through hole of the sintered ceramic member 2.

Figure 4:
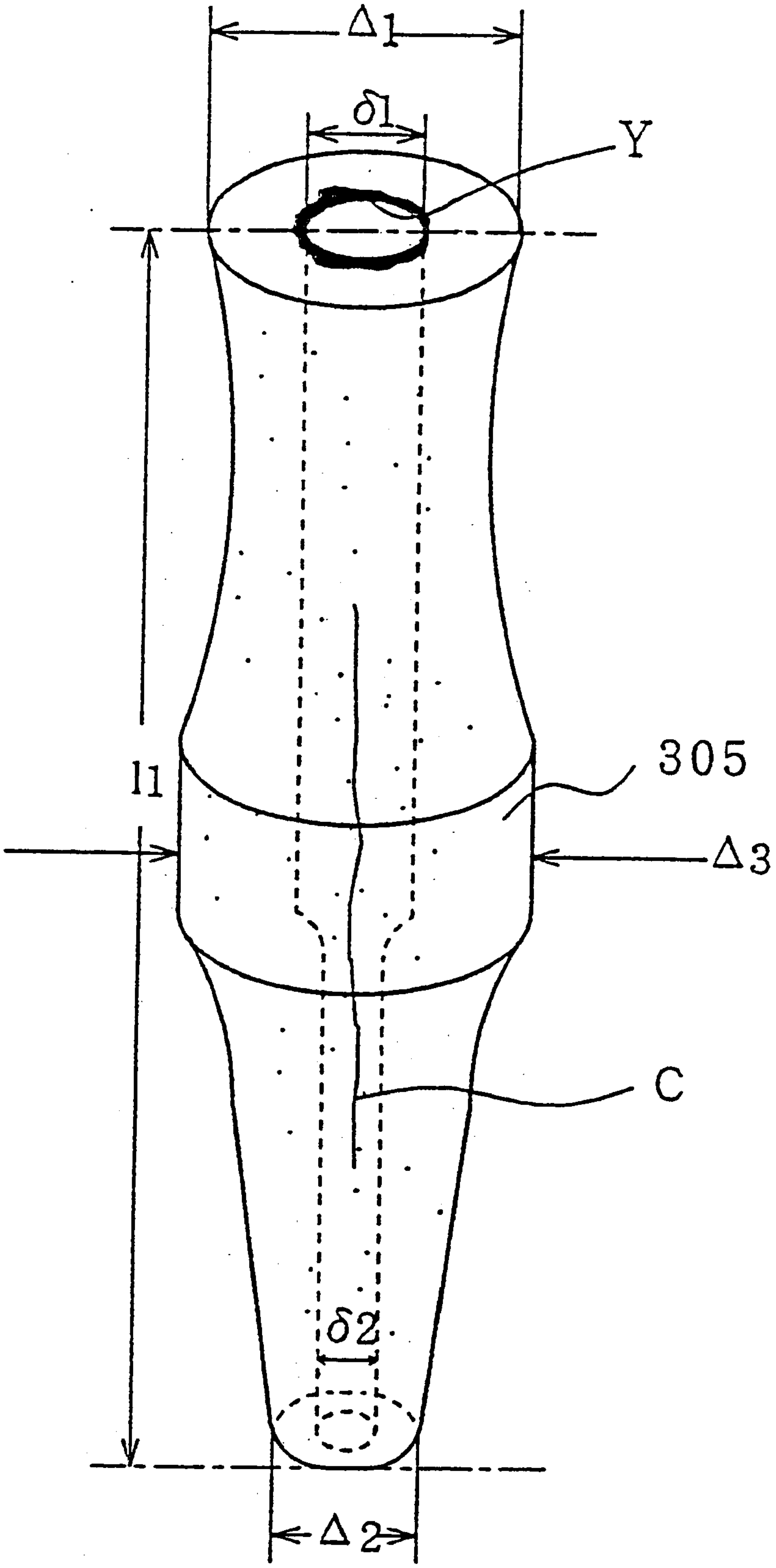
FIG. 4 is a perspective view of shaped compact made by the rubber press method showing occurrence of defects.

A specified amount of the granulated powder PG is packed in the cavity 301 of the mold 300, into which the press pin is inserted, and the upper opening is closed by an upper punch 304. In this state, hydraulic pressure is applied to the outside surface of the rubber mold to compress the granulated powder PG in the rubber mold. Thus a compact 305 is obtained as shown in FIG. 4.

When the granulated powder PG is compressed, 0.7–1.3 parts by weight of water per 100 parts of the granulated powder is added to the granulated powder PG so that agglomerated small lumps existing in the granulated powder are pulverized into individual particles.

The outside surface of the compact 305 is further machined by a grinder, for instance, and thus the compact is finished into the shape of a sintered ceramic body 2.

The compact 305, which has been shaped into approximately the same shape as the sintered ceramic body, is sintered at 1400–1600° C. and a primarily sintered ceramic body is obtained. When the raw material powder contains the Sn inorganic powder, the sintering reaction involving Sn begins as the temperature reaches approximately 1450° C. As a result, carbon dioxide gas, which is generated from the involved organic binder, etc., is expelled from the sintering compact without being enclosed therein, and a dense primarily sintered ceramic body is so prepared.

Figure 5:
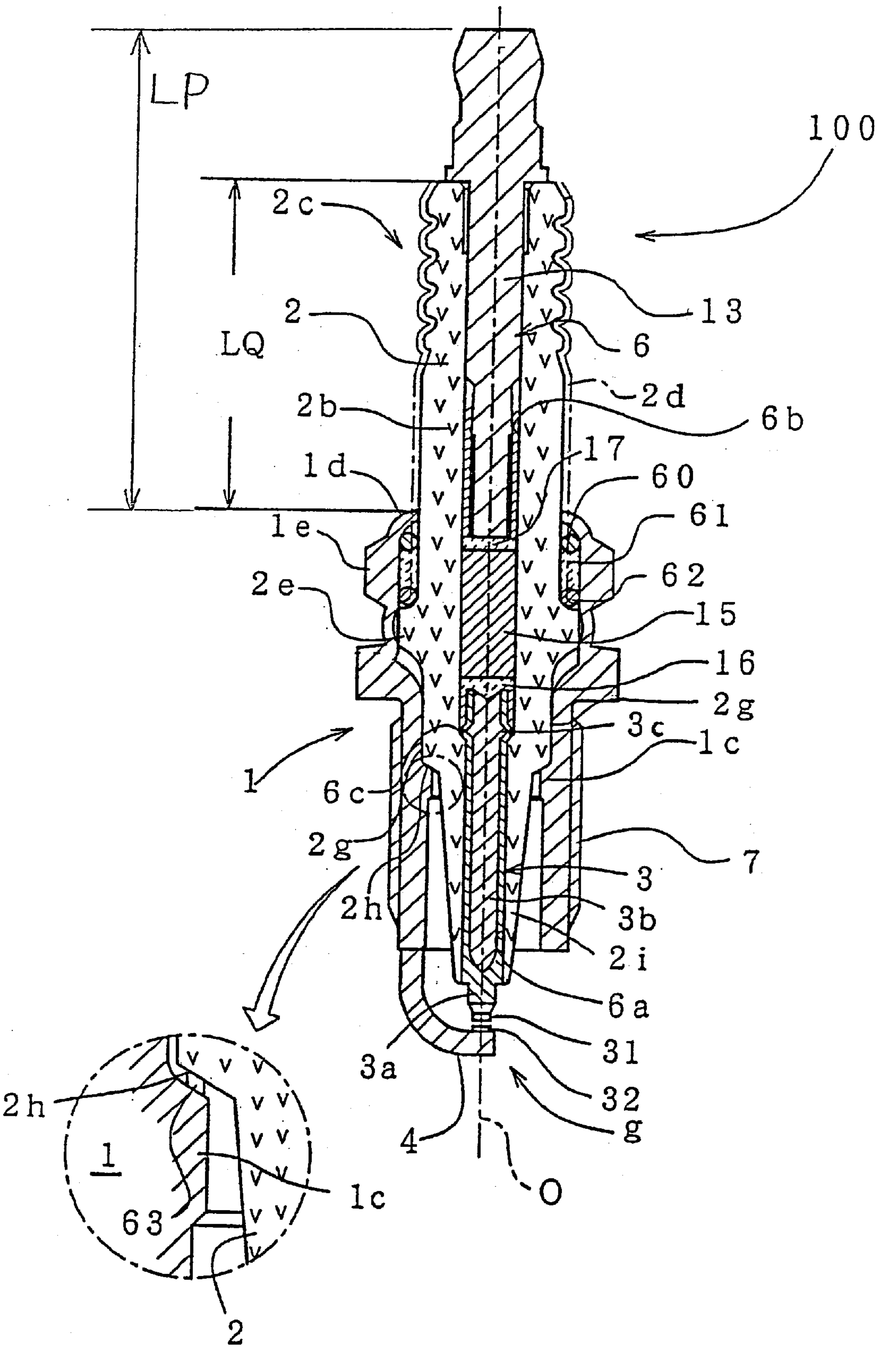
FIG. 5 is an elevational cross-sectional view of an example of the spark plug of this invention.

The primarily sintered ceramic body is glazed and finally fired and thus a finished sintered ceramic body is obtained. In the through hole 6 of this finished sintered ceramic body, a resistor 15 and electrically conductive glass seal 16, 17 are not yet inserted as shown in FIG. 5.

In the process for preparing the sintered ceramic body, said sintered ceramic body may be prepared by glazing said primarily sintered ceramic body and packing a specified amount of a mixture of glass powder and an electrically conductive powder material, if desired, into the through hole, and finally firing it. The sintered ceramic body made by this procedure is already provided with a resistor and electrically conductive seal layer in the through hole.

Spark Plug

The spark plug of this invention comprises the sintered ceramic body incorporated in it.

This spark plug comprises said sintered ceramic body of this invention; a center electrode inserted in one end of the through hole penetrating the sintered ceramic body; a main metal shell mounted on the outside of said one end of the sintered ceramic body; a ground electrode, which is mounted in the main metal shell and has an end portion closely confronting said center electrode; a terminal mounted at the other end of the through hole of the sintered ceramic body; and a resistor which separates the terminal and the center electrode.

A preferred spark plug has a resistance of at least 200 M Ω when electric current is applied across the terminal and the main metal shell in a heating furnace at about 500° C. The spark plug having a resistance of at least 200 M Ω is advantageous in that it does not fail to ignite (sparking occurs normally between the electrodes).

Figure 6:
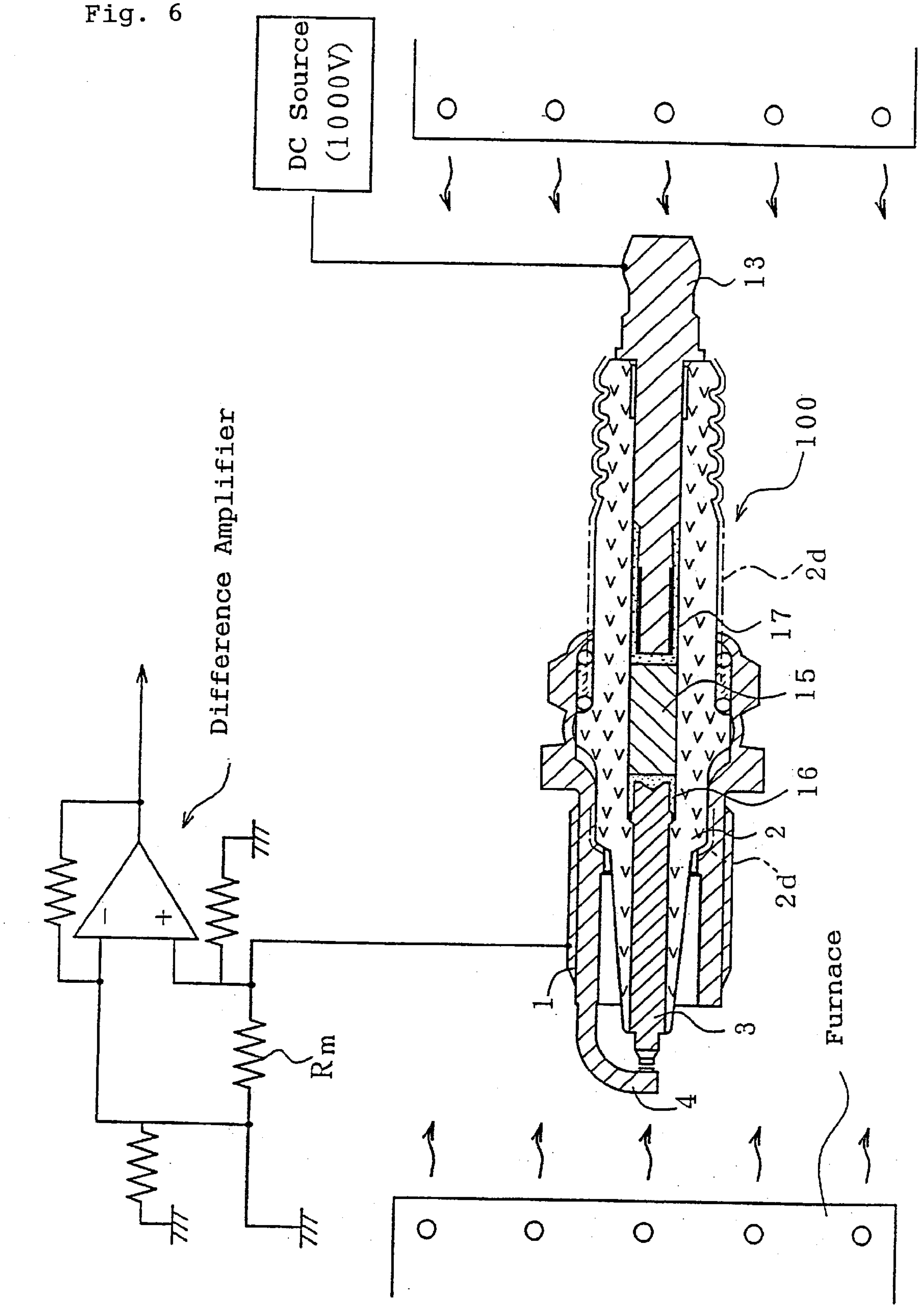
FIG. 6 is a schematic presentation explaining a method for measuring the insulation resistivity of spark plugs.

As shown in FIG. 6, a spark plug 100 is placed in a heating furnace and a terminal 13 is connected to a 1000 V constant voltage DC current source and the main metal shell 1 grounded. In this state, electric current is passed through the spark plug. When electric current Im is measured with the current voltage VS and the current measuring resistance Rm, the insulation withstanding voltage Rx at the spark plug is given by (VS/Im)–Rm. Electric current Im can be measured by output of a differential amplifier, which is interposed in the ground circuit and amplifies voltage difference between the two ends of a current measuring resistance.

The spark plug of this invention is characterized by being provided with a center electrode; a main metal shell mounted on the outside of the center electrode; a ground electrode mounted on one end of the main metal shell so as to confront the center electrode; and a sintered ceramic body of this invention arranged so as to cover the outside of the center electrode between the center electrode and the main metal shell.

Now the spark plug of this invention is described specifically.

Figure 7:
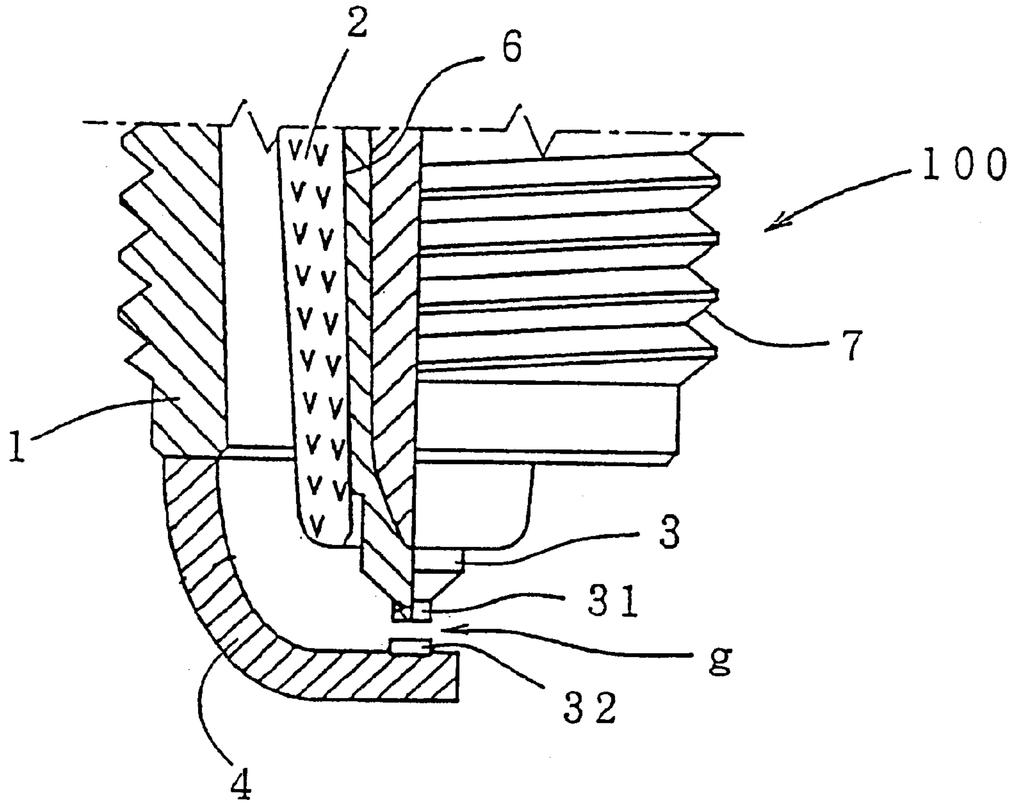
FIG. 7 is an elevational cross-sectional view of the principal part of the spark plug shown in FIG. 5.

As shown in FIG. 5 and FIG. 7, an example of the spark plug 100 of this invention is provided with a main metal shell 1, a sintered ceramic body 2, a center electrode 3 and a ground electrode 4.

The sintered ceramic body 2 is tubular body 2 having a through hole 6, which penetrates the sintered ceramic body from one end to the other end. One end of the sintered ceramic body 2 is tapered reducing the diameter and the other end is provided with corrugation 2c at the outside thereof. The sintered ceramic body 2 has an outwardly projected flange-like portion 2e in the middle part thereof. The part from the flange-like portion 2e to the end of the corrugation 2c is designated main part 2b and this part is provided with glazing 2d. On the front part of the sintered ceramic body from the flange-like portion 2e, there are provided a first shaft portion 2g which is a little smaller than the main part 2b in diameter and a second shaft portion 2i which is further smaller in diameter. The first shaft portion 2g is generally cylindrical and the second shaft portion 2i is conical tapering off toward the end. There is a diameter difference between the first shaft portion 2g and the second shaft portion 2i. This diameter difference is called a step.

The through hole 6 of the sintered ceramic body 2 comprises a first cylindrical hole 6a having a smaller diameter and extending from the tapered end to the middle of the first shaft portion 6a and a second cylindrical hole 6b having an inside diameter larger than that of the first cylindrical hole 6a. At the connection of the first cylindrical hole 6a and the second cylindrical hole 6b, a tapered or curved step 6c is provided to receive and stop the circumferential projection 3*a* of the center electrode 3, which is described in detail later, for fixing it to the ceramic body 2.

A center electrode 3 is placed in one end of the through hole 6 of the sintered ceramic body 2 so that the tip thereof projects out of the through hole 6.

The center electrode 3 has a thin end tip 3*a*, on which is attached spark portion 31 made of a noble metal alloy containing at least one of Ir, Pt and Rh as main component. The center electrode 3 is inserted into the through hole 6 from the corrugation 2*c* side end of the sintered ceramic body 2 until the tip thereof projects out of the first cylindrical hole 6*a* and fixed. In this state, said projection 3*c* engages with a receiving step 6*c* of the second cylindrical hole 6*b* so that the center electrode spark portion 31 projects from the opening of the first cylindrical hole 6*a*. In this state, the ciecumferential projection 3*c* of the center electrode 3 is received at the step 6*c* and prevented from dropping-off out of the end opening of the first cylindrical hole 6*a*.

The center electrode 3 for instance is made of a Ni alloy. The center electrode 3 contains a core member 3*b* made of Cu or a Cu alloy for heat dispersion.

A resistor 15 is placed in the middle part of the through hole 6. Said resistor is prepared by mixing glass powder and an electrically conductive powder and a ceramic powder other than glass if desired and sintering the mixture by a hot press, or the like. One end of the resistor 15 is electrically connected to the center electrode 3 via a glass seal layer 16, if desired. In the through hole 6, a terminal 13 is inserted between the other end of the resistor 15 and the rear opening of the through hole 6. The terminal 13 is electrically connected to the resistor 15 via another electrically conductive glass seal layer 17, if desired.

Around the two shaft portions 2*g* and 2*i* of the sintered ceramic body 2, a main metal shell 1 is mounted as a housing for the spark plug 100. The main metal shell is generally cylindrical body made of low carbon steel or the like. The main metal shell 1 is provided with an inside projection 1*c*, which engages with the step between the first shaft portion 2*g* and the second shaft portion 2*i*, a swaging portion 1*d*, which is swaged onto the outside surface of the main part of the sintered ceramic body 2 which is inserted in the main metal shell; a tool-engaging portion 1*e*, which has hexagonal cross section, so as to engage with a spanner, wrench, etc. and a threaded portion 7, which is screwed into the engine block.

The inside projection 1*c* of the main metal shell 1 contacts the step between the first shaft portion and the second shaft portion via a ring gasket 63. The main metal shell 1 is rigidly mounted on the sintered ceramic body by means of the swaging portion 1*d* with gaskets 60, 62 and a filler layer 61 of talc or the like inserted between the main metal shell 1 and the outside surface of the sintered ceramic body 2.

A ground electrode 4 is connected to the main metal shell 1. The ground electrode 4 extends from the connecting portion of the main metal shell 1 and bends toward the center electrode 3 and the end thereof forms a ground electrode spark portion 32 closely confronting the center electrode spark portion 31. The ground electrode spark portion 32 is made of a noble metal alloy mainly comprising at least one of Ir, Pt and Rh. The clearance between the center electrode spark portion 31 and the ground electrode spark portion 32 is a spark gap, which constitutes the ignition point.

The spark plug 100 is attached to an engine at the threaded portion 7 and ignites the gas mixture supplied to combustion chamber.

Figure 8:
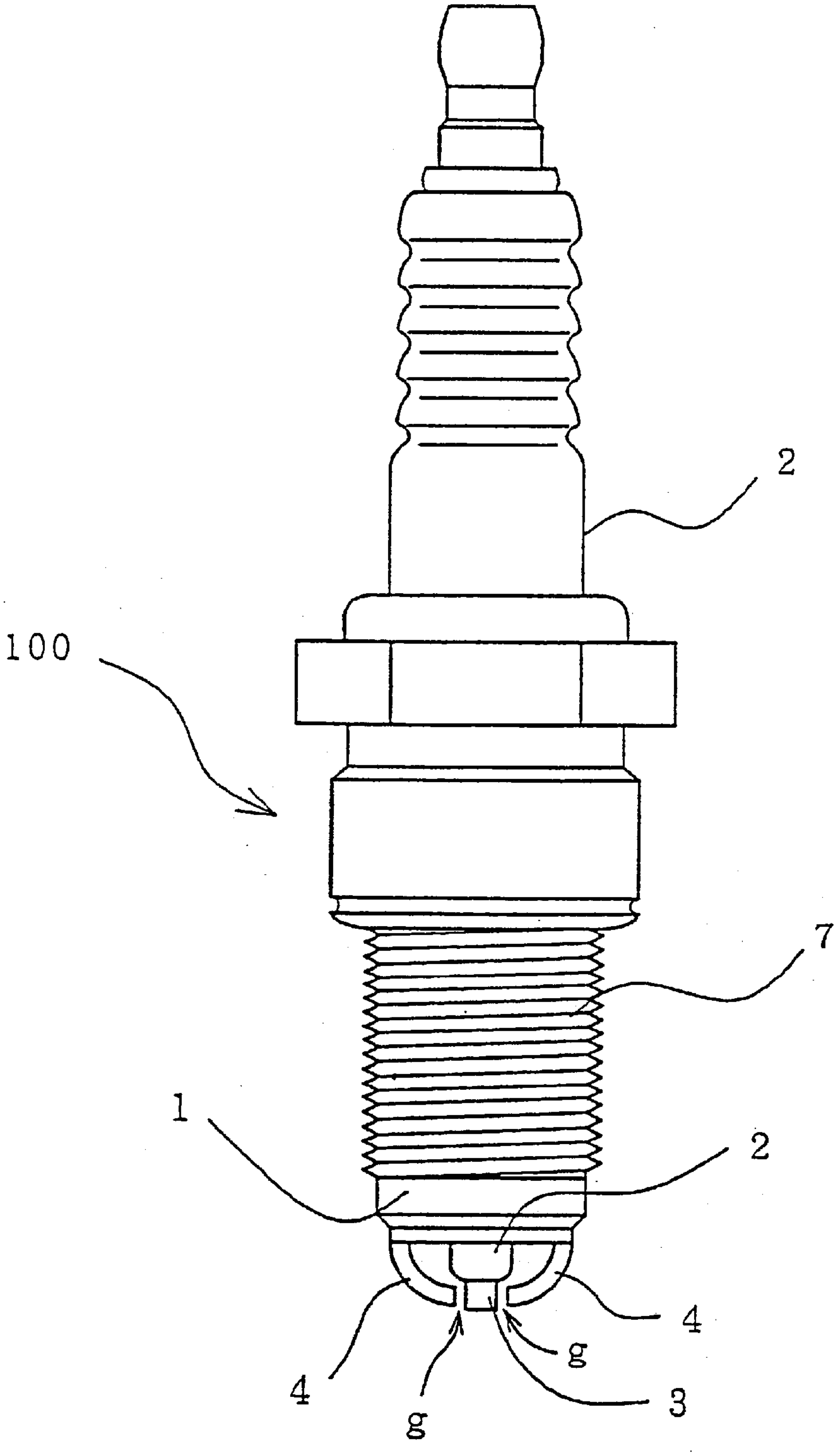
FIG. 8 is an overall elevational view showing another example of the spark plug of this invention.
Figure 9A:
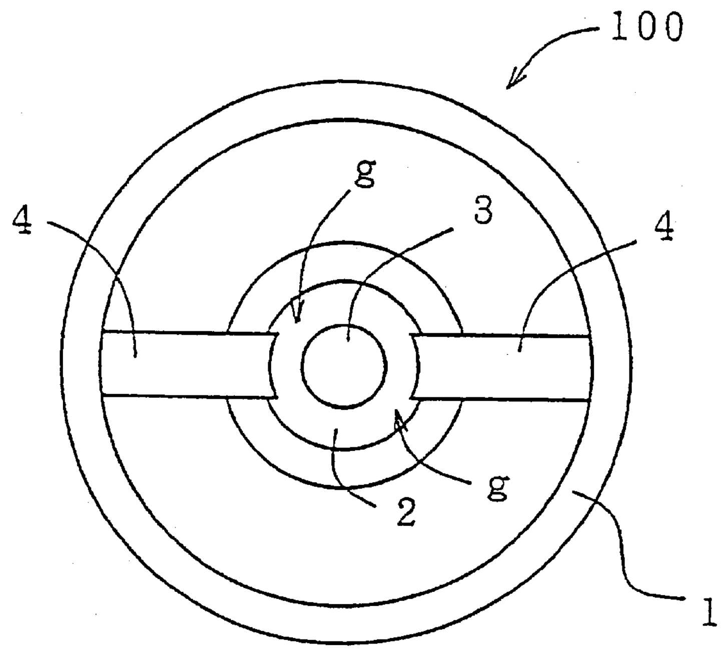
FIG. 9A is a plan view of the spark plug shown in FIG. 8
Figure 9B:
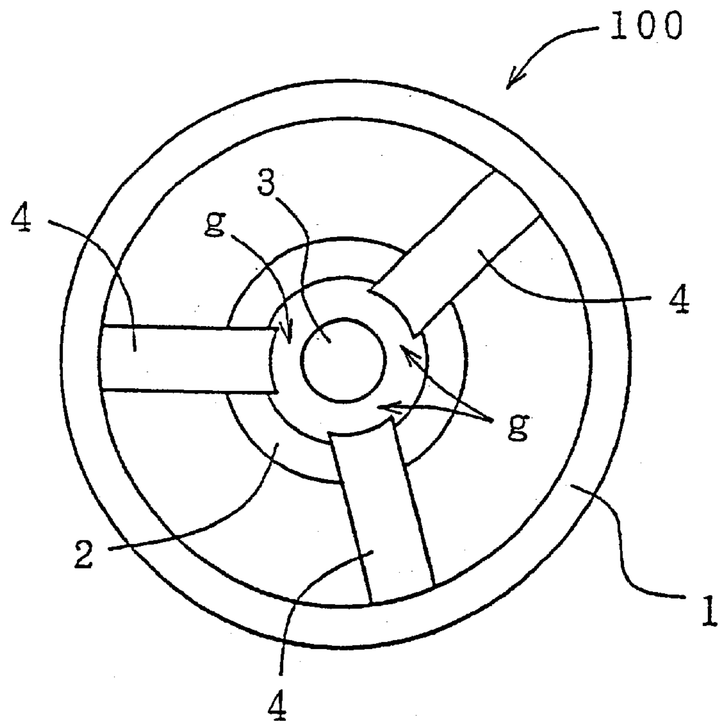
FIG. 9B is a plan view of a modified form of the spark plug shown in FIG. 8.

The spark plug of this invention is not limited to the type shown in FIGS. 5 and 7, but may be a type in which the tip of the ground electrode 4 confronts the side surface of the center electrode 3 to form a spark gap g, for instance as shown in FIG. 8. In this case, the ground electrode 4 can have an embodiment in which two ground electrodes 4 are provided respectively closely confronting the two sides of the center electrode as shown in FIG. 9A, as well as an embodiment in which three or more ground electrodes 4 are provided symmetrically closely confronting the center electrode.

Figure 10:
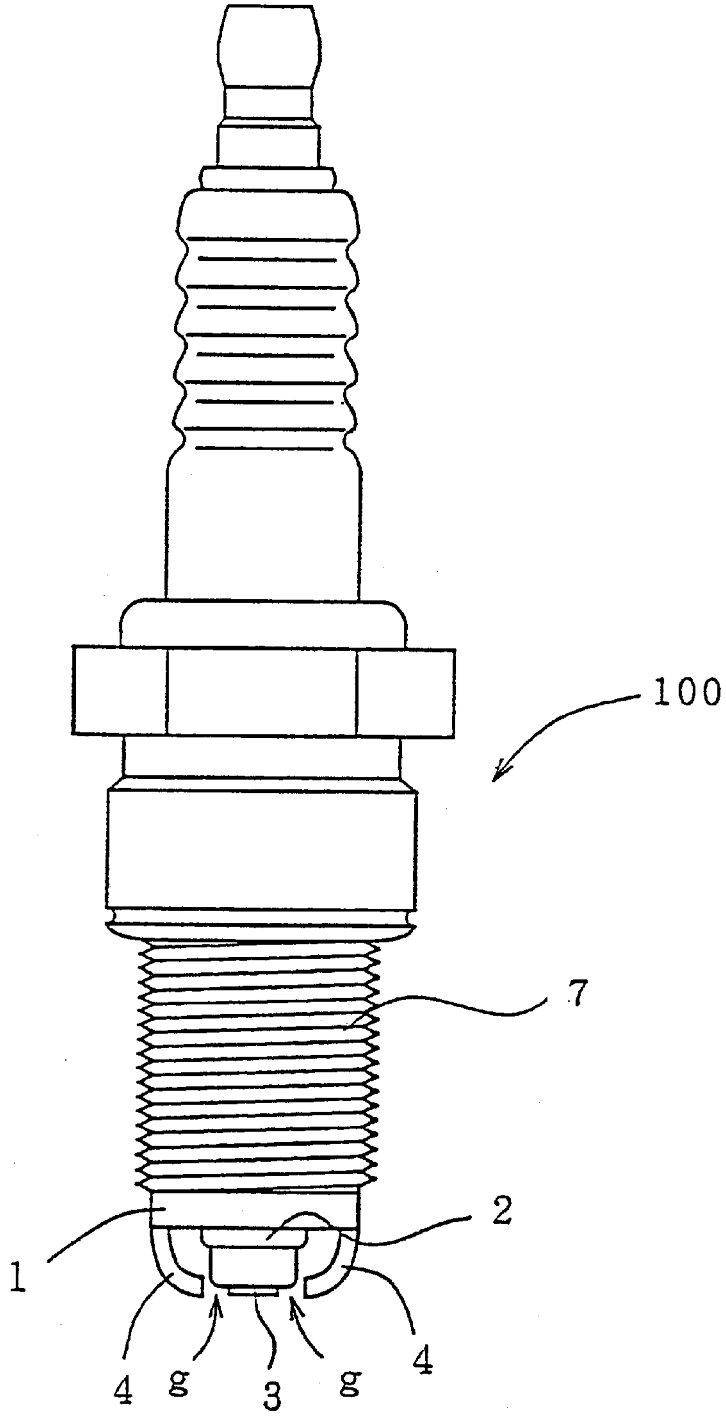
FIG. 10 is an overall elevational view of another example of the spark plug of this invention.

In this latter case, as shown in FIG. 10, the spark plug may be constructed as a semi-circumferential discharge spark plug, in which the tip of the sintered ceramic body 2 extends into the space between the side surface of the center electrode 3 and the end surface of the ground electrode 4. With this structure, spark discharge occurs at the circumferential surface of the tip of the sintered ceramic body and, therefore, contamination resistance is improved in comparison with the in-air discharge type spark plug.

DESCRIPTION OF THE EXAMPLE

The following experiments were carried out to confirm the technical effect of this invention.

Example 1

To alumina powders (average particle diameter: 30 $\mu$m) containing various amounts of Sn components, $SiO_2$ (purity: 99.5 %, average particle diameter: 1.5 $\mu$m ), there were admixed $CaCO_3$ (purity: 99.9 %, average particle diameter: 2.0 $\mu$m), MgO (purity: 99.5 %, average particle diameter: 2.0 $\mu$m), $BaCO_3$ (purity: 99.5 %, average particle diameter: 1.5 $\mu$m), $H_2BO_3$ (purity: 99.0 %, average particle diameter: 1.5 $\mu$m), ZnO (purity: 99.5 %, average particle diameter: 2.0 $\mu$m) in a predetermined amount. To 100 parts by weight of each of the thus mixed powders, 3 parts by weight of polyvinyl alcohol (PVA) as a hydrophilic binder, and 103 parts by weight of water were added and mixed well to form slurries. The average particle diameter of alumina powder was measured by a laser-diffraction particle size analyzer.

These slurries having different compositions were spray-dried and granulated powders were prepared. The granulated powders were screened to 50–100 $\mu$m. Further, 1 part by weight of PVA was added to 100 parts by weight of the granulated powder and softly mixed. The thus prepared granulated mixture was shaped by the rubber press method as explained with respect to FIG. 3 with a pressure of 50 MPa and a compact 305 as shown in FIG. 4 was obtained. The outside surface of the compact was machined by a grinder to the final shape of the sintered ceramic body, which was sintered under the prescribed conditions, and thus a sintered ceramic body 2 of the same shape as shown in FIG. 5 was obtained. The sintering conditions were as follows. The sintering time was 2 hours. The sintering temperature was varied with an interval of 20° C. in order for the apparent density of the resulting sintered ceramic body to be maximum.

Figure 11A:
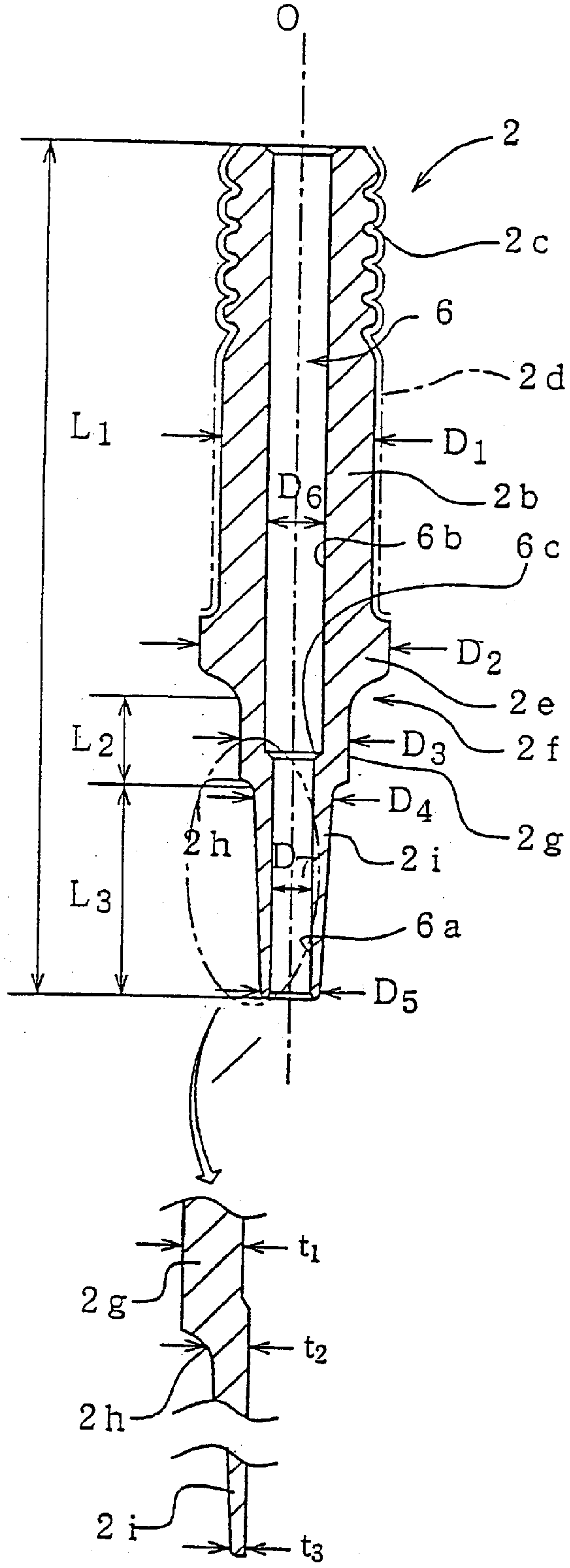
FIG. 11A and FIG. 11B are elevational cross-sectional views of sintered ceramic bodies of this invention showing size of parts thereof.
Figure 11B:
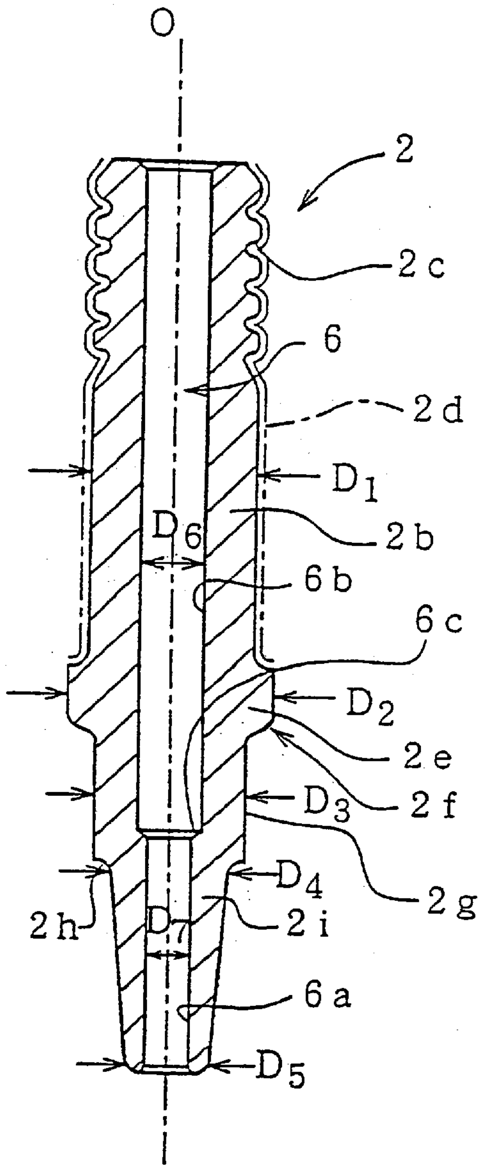

The size of the sintered ceramic body 2 as indicated in FIG. 11A was as follows.

L1=ca. 60 mm, L2=ca. 8 mm, L3=ca. 14 mm,

D1=ca. 10 mm, D2=ca. 13 mm, D3=ca. 7 mm, D4=5.5 mm, D5=4.5 mm, D6=ca. 4 mm, D7=2.6 mm, t1=1.5 mm, t2=1.45 mm, t3=1.25 mm, tA=1.48 mm.

The length LQ of the part of the sintered ceramic body 2 extending rearward from the main shell as shown in FIG. 5 was 25 mm. In the elevational cross-sectional plane containing the central axis line O of the sintered ceramic body 2, the length LP from the position corresponding to the rear end of the main metal shell 1 to the rear end of terminal 13 via the corrugated portion was 29 mm. The external diameter of the threaded portion was 12 mm.

Using sintered ceramic bodies 2 having compositions as shown in Table 1, spark plugs having the same structure as shown in FIG. 5, except that the terminal 13 and the center electrode 3 were connected via the electrically conductive glass layer without the resistor 15, were made. These spark plugs were subjected to the following tests.

① Measurement of insulation withstanding voltage at 20° C. was carried out using DC pulse current source (pulse width 3 ms) as already explained with respect to FIG. 2.

② Measurement of insulation resistance at 500° C. was carried out using current voltage of 1000 V as explained with respect to FIG. 6.

③ Voltage withstanding test was carried out using a real engine. The above-described spark plugs were attached to a four cylinder gasoline engine (chamber capacity: 2000 cc), which was operated with the throttle valve completely open at 6000 rpm. The engine was continuously operated with discharge voltage controlled in a range of 38–43 kV. The spark plug was evaluated by whether or not penetration destruction occurred after 50 hours.

After the test, the cross-sectional plane of the sintered ceramic body of the spark plug 100 was polished and the polished plane was observed with a scanning electron microscope (×150) and number of minute voids having a diameter in excess of 10 μm was counted by image analysis. The void fraction per 1 $mm^2$ was obtained by dividing the number of the observed minute voids by the total area of the visual field.

Using the same granulated powders as used to make sintered ceramic bodies, test pieces for strength tests were made as follows. Granulated powder was shaped by press molding (pressure: 50 MPa) and sintered under the same condition as preparation of sintered ceramic bodies. From the sintered lumps, 3 mm×3 mm×25 mm pieces were cut out. The three point bending strength (span length: 20 mm) of these test pieces were measured in accordance with the test method stipulated in JIS R1601 (1981) at room temperature.

After the bending strength test, the surface of the test pieces was further polished and the surface was observed by a scanning electron microscope. The number of closed pores having the size of 0.5–2 mm appearing in the observed surface was counted. The number of closed pores confirmed in the total area observed is taken as number of closed pores. The contents of Al, Na, Si, Ca, Mg, Ba, Zn and B components were measured by the ICP method and contents as oxides (unit: wt %) were calculated.

The results are shown in Table 1 and 2. In the evaluation of the results of the real engine test shown in Table 2, ◎ means: "excellent", ○ means: "good" and X means: "unsatisfactory".

TABLE 1

| | Composition of Sintered Ceramic Body (wt %) | | | | | | | |
|---|---|---|---|---|---|---|---|---|
| | Principal Components | | | | | Other Components | | Sintering Condition |
| Sample No | SnO | $Al_2O_3$ | $SiO_2$ | CaO | MgO | ① | ② | (° C. × hr) |
| A-1* | 0 | 94.0 | 2.08 | 2.44 | 0.48 | BaO 0.7 | $B_2O_3$ 0.3 | 1580 × 2 |
| A-2 | 0.05 | 94.0 | 2.05 | 2.42 | 0.47 | BaO 0.7 | $B_2O_3$ 0.3 | 1580 × 2 |
| A-3 | 0.26 | 94.0 | 1.97 | 2.31 | 0.46 | BaO 0.7 | $B_2O_3$ 0.3 | 1580 × 2 |
| A-4 | 0.47 | 94.0 | 1.88 | 2.21 | 0.44 | BaO 0.7 | $B_2O_3$ 0.3 | 1580 × 2 |
| A-5 | 1.03 | 94.0 | 1.65 | 1.94 | 0.38 | BaO 0.7 | $B_2O_3$ 0.3 | 1580 × 2 |
| A-6 | 1.52 | 94.0 | 1.45 | 1.70 | 0.33 | BaO 0.7 | $B_2O_3$ 0.3 | 1580 × 2 |
| A-7 | 2.00 | 94.0 | 1.25 | 1.46 | 0.29 | BaO 0.7 | $B_2O_3$ 0.3 | 1580 × 2 |
| A-8* | 2.48 | 94.0 | 1.05 | 1.23 | 0.24 | BaO 0.7 | $B_2O_3$ 0.3 | 1580 × 2 |
| A-9* | 3.03 | 94.0 | 0.82 | 0.96 | 0.19 | BaO 0.7 | $B_2O_3$ 0.3 | 1580 × 2 |
| A-10 | 0.5 | 94.0 | 1.87 | 2.20 | 0.43 | BaO 1.0 | — | 1580 × 2 |
| A-11 | 0.5 | 94.0 | 1.87 | 2.20 | 0.43 | BaO 0.5 | ZnO 0.5 | 1580 × 2 |
| A-12 | 0.5 | 94.0 | 1.87 | 2.20 | 0.43 | $B_2O_3$ 0.2 | ZnO 0.8 | 1580 × 2 |
| A-13 | 0.5 | 94.0 | 2.04 | 2.39 | 0.47 | $B_2O_3$ 06 | — | 1580 × 2 |
| A-14 | 0.5 | 95.0 | 1.62 | 1.90 | 0.38 | $B_2O_3$ 0.3 | ZnO 1.3 | 1580 × 2 |

*Comparative Example

TABLE 2

| Sample No. | No. of Pores (Number) | Void Occurrence (No./$mm^2$) | 20° C. Withstand Volt. (KV/mm) | 500° C. Insul. Resist (MΩ) | Strength (MPa) | Real Engine Test (Evaluation) |
|---|---|---|---|---|---|---|
| A-1* | 37 | 46 | 32 | 4800 | 220 | ○ |
| A-2 | 9 | 35 | 43 | 4000 | 370 | ◎ |
| A-3 | 10 | 29 | 41 | 3500 | 360 | ◎ |
| A-4 | 11 | 27 | 41 | 2500 | 380 | ◎ |
| A-5 | 5 | 19 | 40 | 2000 | 450 | ◎ |
| A-6 | 3 | 18 | 39 | 800 | 460 | ○ |
| A-7 | 1 | 15 | 37 | 500 | 490 | ○ |
| A-8* | 2 | 16 | 34 | 150 | 470 | X |
| A-9* | 1 | 11 | 33 | 80 | 480 | X |
| A-10 | 10 | 26 | 41 | 2500 | 390 | ◎ |
| A-11 | 11 | 20 | 40 | 2200 | 380 | ◎ |

TABLE 2-continued

| Sample No. | No. of Pores (Number) | Void Occurrence (No./mm$^2$) | 20° C. Withstand Volt. (KV/mm) | 500° C. Insul. Resist (MΩ) | Strength (MPa) | Real Engine Test (Evaluation) |
|---|---|---|---|---|---|---|
| A-12 | 9 | 18 | 40 | 2200 | 400 | ◎ |
| A-13 | 10 | 22 | 41 | 2500 | 370 | ◎ |
| A-14 | 11 | 21 | 40 | 2400 | 390 | ◎ |

*Comparative Example

It was revealed that the sintered ceramic body containing 0.05–2.0 wt % of Sn (as SnO) has a fewer number of closed pores and its insulation voltage withstanding ability, strength and voltage withstanding ability in the real engine test are superior to the sintered ceramic body containing less than 0.05 wt %. Spark plugs incorporating such Sn exhibits insulation resistance of not more than 200 M Ω.

content of the surface layer were measured as described above. Average particle diameter was measured by laser diffraction particle size analyzer.

Using these granulated slurries, the same experiment as in Example 1 was carried out. The results are shown Table 3 and 4.

TABLE 3

| Sample No. | Na Ccont. of Ceramic Body. (wt %) | Alumina Powder: Total Na Cont. (wt %) | Alumina Powder: Surface Na Cont. (wt %) | Alumina Powder: P'icle Diia. ($\mu$m) | Composition of Sinterrd Ceramic Body (wt %): Principal Components: SnO | $Al_2O_3$ | $SiO_2$ | CaO | MgO | Other Comp.: ① | | ② | | Sint'g (° C. × hr) |
|---|---|---|---|---|---|---|---|---|---|---|---|---|---|---|
| B-1 | 0.03 | 0.04 | 0.01 | 3.0 | 0.5 | 94.0 | 2.8 | 1.8 | 0.5 | BaO | 0.7 | $B_2O_3$ | 0.3 | 1550 × 2 |
| B-2 | 0.05 | 0.07 | 0.02 | 3.0 | 0.5 | 94.0 | 2.8 | 1.8 | 0.5 | BaO | 0.7 | $B_2O_3$ | 0.3 | 1550 × 2 |
| B-3 | 0.07 | 0.10 | 0.03 | 3.0 | 0.5 | 94.0 | 2.8 | 1.8 | 0.5 | BaO | 0.7 | $B_2O_3$ | 0.3 | 1550 × 2 |
| B-4 | 0.12 | 0.17 | 0.05 | 3.0 | 0.5 | 94.0 | 2.8 | 1.8 | 0.5 | BaO | 0.7 | $B_2O_3$ | 0.3 | 1550 × 2 |
| B-5 | 0.25 | 0.35 | 0.14 | 3.0 | 0.5 | 94.0 | 2.8 | 1.8 | 0.5 | BaO | 0.7 | $B_2O_3$ | 0.3 | 1550 × 2 |
| B-6 | 0.41 | 0.63 | 0.19 | 3.0 | 0.5 | 94.0 | 2.8 | 1.8 | 0.5 | BaO | 0.7 | $B_2O_3$ | 0.3 | 1550 × 2 |
| B-7 | 0.50 | 0.76 | 0.23 | 3.0 | 0.5 | 94.0 | 2.8 | 1.8 | 0.5 | BaO | 0.7 | $B_2O_3$ | 0.3 | 1550 × 2 |

TABLE 4

| Sample No. | Void Occurrence (No. of Voids) | 20° C. Withstand Volt. (KV/mm) | 500° C. Insul. Resist. (MΩ) | Strength (MPa) | Real Engine Test (Evaluation) |
|---|---|---|---|---|---|
| B-1 | 24 | 47 | 4100 | 450 | ◎ |
| B-2 | 21 | 48 | 3200 | 430 | ◎ |
| B-3 | 18 | 50 | 2500 | 400 | ◎ |
| B-4 | 17 | 49 | 1500 | 420 | ◎ |
| B-5 | 25 | 45 | 1000 | 440 | ◎ |
| B-6 | 15 | 41 | 650 | 410 | ○ |
| B-7 | 24 | 35 | 500 | 420 | ○ |

Example 2

To 100 g of various Bayer Process aluminas (average particle diameter: 3.0 $\mu$m) containing different amounts of Na component, 200 g of water of 25° C. was added and the mixture was stirred for 10 minutes and the powders were collected, washed and dried. To these powders were added, $SiO_2$ (purity: 99.5 %, average particle diameter: 1.5 $\mu$m), $CaCO_3$ (purity: 99.9 %, average particle diameter:2.0 $\mu$m), MgO (purity: 99.5 %, average particle diameter: 2.0 $\mu$m), $BaCO_3$ (purity: 99.5 %, average particle diameter: 1.5 $\mu$m), and $H_2BO_3$ (purity 99.0 %, average particle diameter 1.5 $\mu$m). Then 100 parts by weight of each mixed powders, 3 parts by weight of PVA as a binder and 103 parts by weight of water were mixed and thus slurries were prepared. The pH of the slurries was adjusted to 8 by addition of a suitable amount of citric acid. With respect to aluininas after washing, the total content of Na component and the Na The sintered ceramic body containing 0.07–0.5 wt % of Na component as $Na_2O$ has insulation withstanding voltage, strength and voltage withstanding ability in the real engine test of the same level as sintered ceramic bodies comprising alumina containing less than 0.05 wt % of Na component. The spark plugs exhibited insulation resistivity not lower than 200 MPa.

Example 3

To a Bayer Process alumina powder (average particle diameter: 3.0 $\mu$m), there were added $SiO_2$ (purity: 99.5 %, average particle diameter: 1.5 $\mu$m), $CaCO_3$ (purity: 99.9 %, average particle diameter: 2.0 $\mu$m) and MgO (purity: 99.5 %, average particle diameter: 2.0 $\mu$m), in amounts as indicated in Table 5. To 100 parts by weight of the thus prepared mixed powders, 3 parts by weight of PVA as a hydrophilic binder and 103 parts by weight of water were added and mixed to form a slurry. The pH of the slurries was adjusted to 8 by addition of a suitable amount of citric acid. With respect to alumina after washing, the total content of Na component and the Na content of the surface layer were measured as described before. Average particle diameter was measured by laser diffraction particle size analyzer.

Using these slurries, the same experiment as Example 1 was carried out. The results are shown in Table 5 and 6.

TABLE 5

| Sample No. | Na Ccont. of Ceramic Body. (wt %) | Alumina Powder Total Na Cont. (wt %) | Alumina Powder Surface Na Cont. (wt %) | P'icle Diia. (μm) | Composition of Sinterrd Ceramic Body (wt %) Principal Components SnO | $Al_2O_3$ | $SiO_2$ | CaO | MgO | Other Comp. ① | ② | Sint'g (° C. × hr) |
|---|---|---|---|---|---|---|---|---|---|---|---|---|
| C-1 | 0.10 | 0.20 | 0.06 | 3.0 | 0.5 | 80.0 | 3.3 | 2.0 | 0.8 | — | — | 1550 × 2 |
| C-2 | 0.10 | 0.20 | 0.06 | 3.0 | 0.5 | 85.0 | 3.3 | 2.0 | 0.8 | — | — | 1550 × 2 |
| C-3 | 0.13 | 0.20 | 0.06 | 3.0 | 0.5 | 92.0 | 3.3 | 2.0 | 0.8 | — | — | 1550 × 2 |
| C-4 | 0.13 | 0.20 | 0.06 | 3.0 | 0.5 | 95.0 | 3.3 | 2.0 | 0.8 | — | — | 1560 × 2 |
| C-5 | 0.14 | 0.20 | 0.06 | 3.0 | 0.5 | 97.0 | 3.3 | 2.0 | 0.8 | — | — | 1560 × 2 |
| C-6 | 0.14 | 0.20 | 0.06 | 3.0 | 0.5 | 98.0 | 3.3 | 2.0 | 0.8 | — | — | 1580 × 2 |
| C-7 | 0.15 | 0.20 | 0.06 | 3.0 | 0.5 | 99.0 | 3.3 | 2.0 | 0.8 | — | — | 1600 × 2 |

TABLE 6

| Sample No. | Void Occurrence (No./mm$^2$) | 20° C. Withstand Volt. (KV/mm) | 500° C. Insul. Resis. (MΩ) | Strength (MPa) | Real Engine Test (Evaluation) |
|---|---|---|---|---|---|
| C-1 | 32 | 37 | 2000 | 380 | ○ |
| C-2 | 28 | 41 | 2200 | 460 | ◎ |
| C-3 | 30 | 47 | 3200 | 480 | ◎ |
| C-4 | 22 | 50 | 3500 | 490 | ◎ |
| C-5 | 26 | 44 | 3800 | 470 | ◎ |
| C-6 | 29 | 40 | 5000 | 460 | ◎ |
| C-7 | 21 | 35 | 5500 | 390 | ○ |

*Comparative Example

It was revealed that when $Al_2O_3$ content is 85–98 wt %, the sintered ceramic body exhibits good voltage withstanding and strength.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternatives forms without departing from the invention.

Thus the expressions "means to . . ." and "means for . . .", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

What is claimed is:

1. A sintered ceramic body which is a cylindrical insulator having a through hole to be used for spark plugs, said sintered ceramic body comprising alumina as a main component, Sn component in an amount of 0.05–2 wt % as SnO, and 0.07–0.5 wt % of Na component as $Na_2O$.

2. The sintered ceramic body as described in claim 1, containing 0.07–0.25 wt % of Na component as $Na_2O$.

3. A sintered ceramic body which is a cylindrical insulator having a through hole to be used for spark plugs, said sintered ceramic body comprising alumina as a main component, Sn component in an amount of 0.05–2 wt % as SnO, and at least one component selected from the group consisting of $SiO_2$, CaO, MgO, BaO, ZnO and $B_2O_3$ in a total amount of 0.1–0.5 wt %.

4. The sintered ceramic body as described in claim 1, which contains 0.02–1 wt % of BaO, 0.01–0.75 wt % of $B_2O_3$, 0.04 wt %–2 wt % of ZnO, 1.5–5 wt % of $SiO_2$, 1.2–4 wt % of CaO and 0.05–0.17 wt % of MgO.

5. The sintered ceramic body as described in claim 1, which comprises alumina matrix particles, of which the alumina content is not less than 99 wt %, and glass phase formed inter-particle at boundaries of said alumina matrix particles.

6. The sintered ceramic body as described in claim 5, wherein the average particle diameter of said particles constituting the alumina matrix is 2–20 μm, said alumina particle being crystalline.

7. A process for preparing a sintered ceramic body comprising:

preparing a slurry by mixing alumina, 0.05–2 wt % of Sn component as SnO, and 0.07–0.5 wt % of Na component as $Na_2O$, water and a binder;

obtaining granulated powder from the slurry;

packing the obtained granulated powder into a mold and compressing it to form a compact having the same shape as the intended sintered ceramic body, and sintering the compact.

8. A spark plug, comprising:

a cylindrical sintered ceramic body having a through hole formed of alumina as a main component, 0.05–2 wt % of a Sn component as SnO, and 0.07–0.5 wt % of Na component as $Na_2O$;

a center electrode inserted in one end of said through hole;

a main metal shell mounted on the outside of said sintered ceramic body, to which said center electrode is attached;

a ground electrode attached to the main metal shell having a tip closely confronting the center electrode with a gap therebetween; and a terminal mounted in the other end of the through hole.

9. The spark plug as described in claim 8, which further includes an electrically conductive glass seal layer mounted in the through hole, said glass seal layer making an electrical connection between the terminal and the center electrode to conduct electricity.

* * * * *